Figure 1:
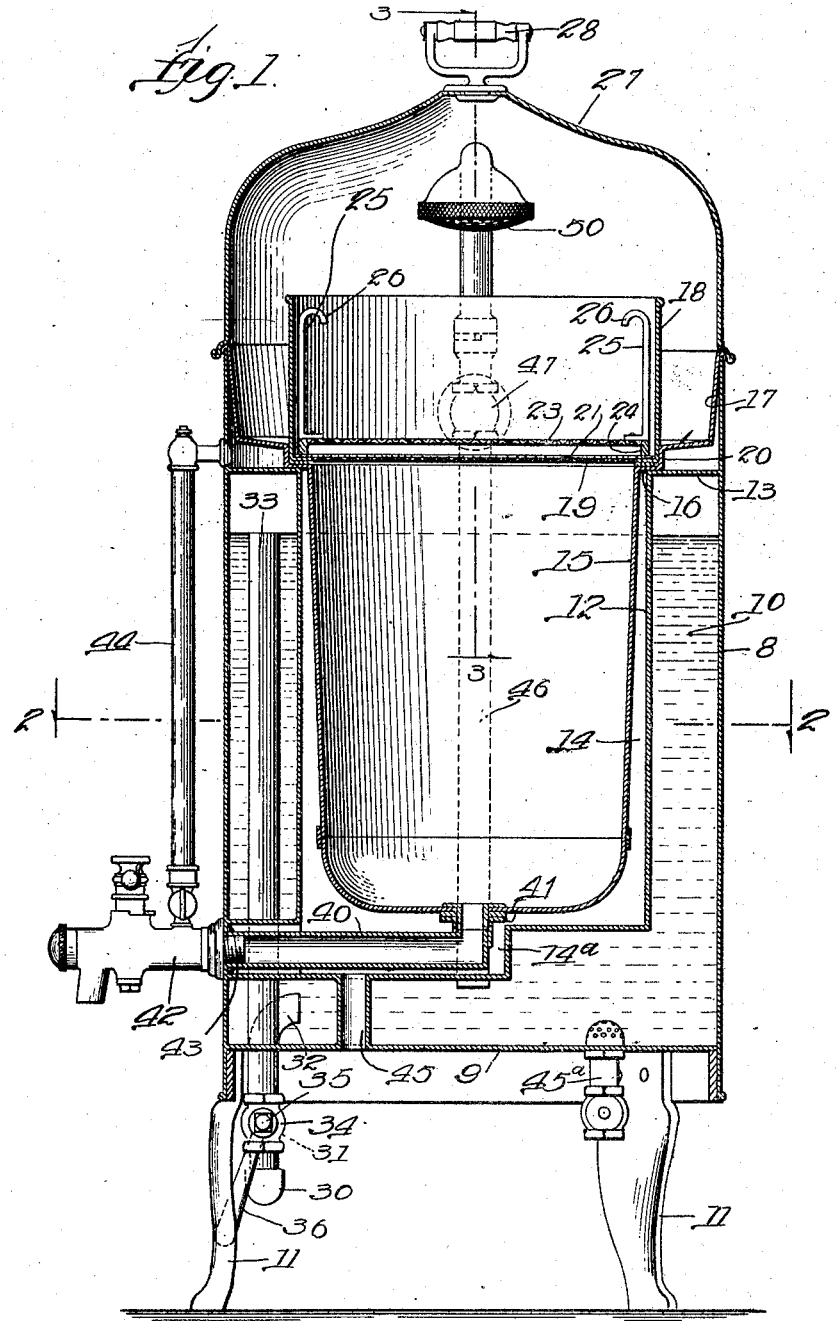

Feb. 9, 1926. 1,572,221
W. H. PETERSEN
COFFEE URN
Filed August 1, 1923 3 Sheets-Sheet 1

Inventor:
William H. Petersen
By Fred Gerlach
his Atty.

Feb. 9, 1926.
W. H. PETERSEN
1,572,221
COFFEE URN
Filed August 1, 1923     3 Sheets-Sheet 2
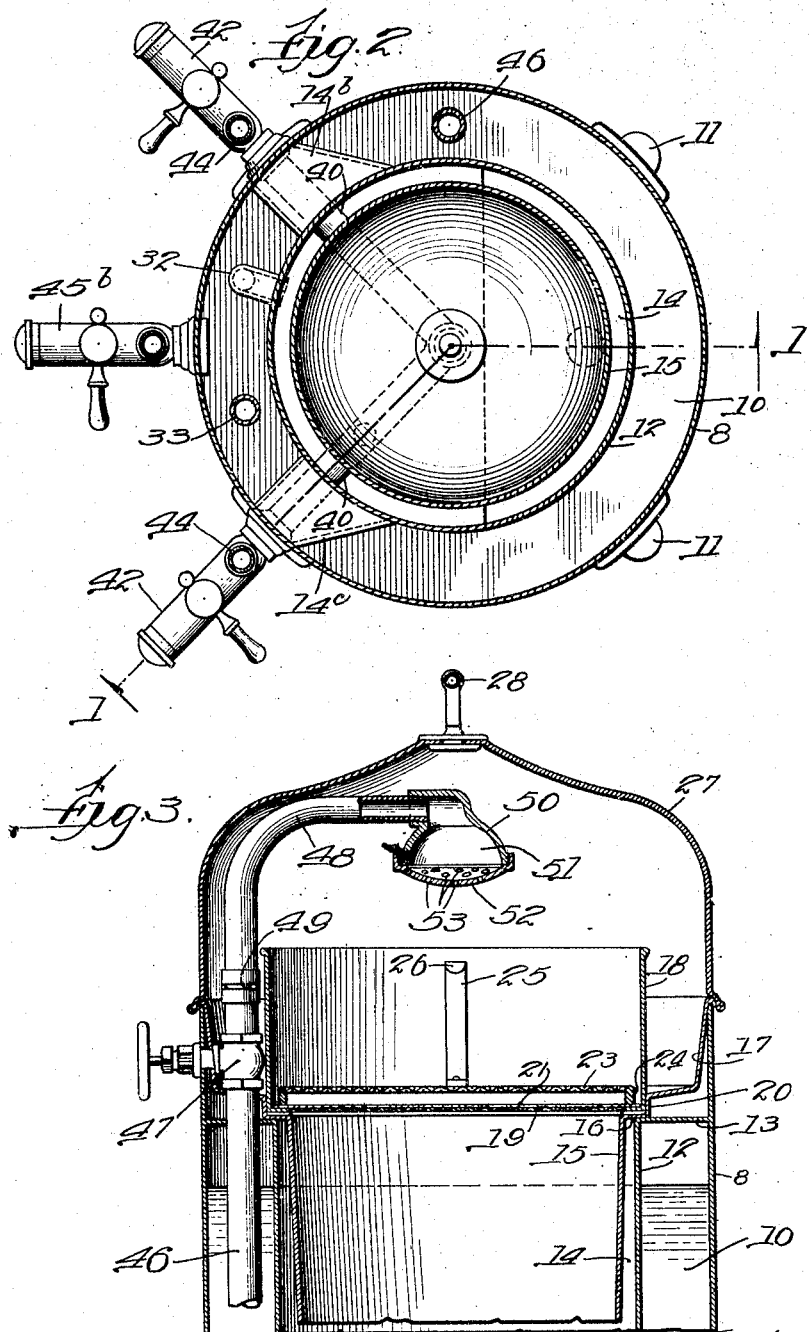

Feb. 9, 1926. 1,572,221
W. H. PETERSEN
COFFEE URN
Filed August 1, 1923  3 Sheets-Sheet 3
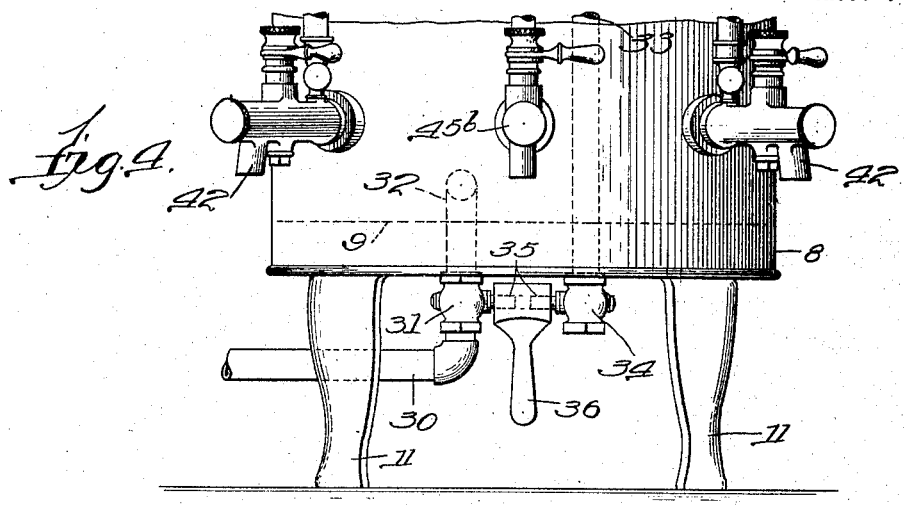
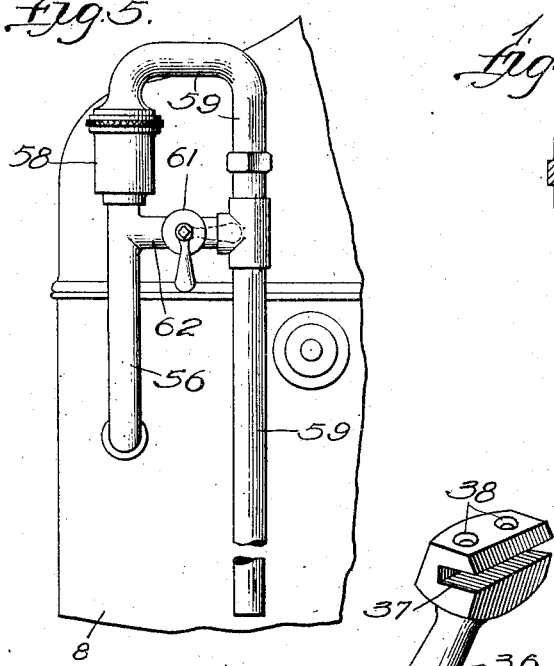
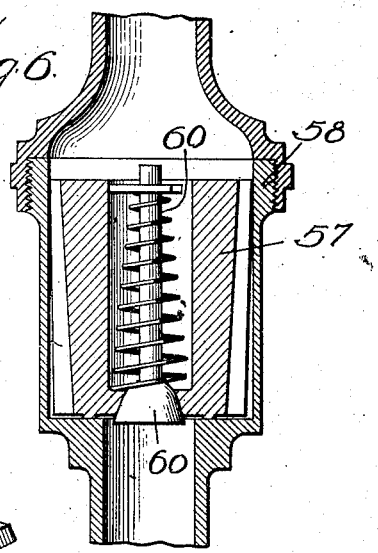
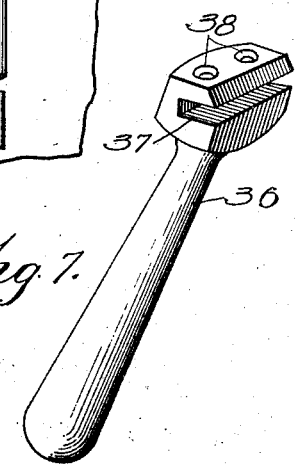
Inventor:
William H. Petersen
by Fred Gerlach
his Atty.

Patented Feb. 9, 1926.

1,572,221

UNITED STATES PATENT OFFICE.

WILLIAM H. PETERSEN, OF CHICAGO, ILLINOIS, ASSIGNOR TO ALBERT PICK & COMPANY, OF CHICAGO, ILLINOIS, A CORPORATION OF ILLINOIS.

COFFEE URN.

Application filed August 1, 1923. Serial No. 654,998.

*To all whom it may concern:*

Be it known that I, WILLIAM H. PETERSEN, a citizen of the United States, and a resident of Chicago, in the county of Cook and State of Illinois, have invented certain new and useful Improvements in Coffee Urns, of which the following is a full, clear, and exact description.

The invention relates to coffee urns and its object is to provide an improved construction in which the outlet pipe from the coffee jar or receptacle is readily removable from the air-chamber in which the jar is retained; in which provision is made for spreading the spray of water over all portions of the filter; in which separate conjointly operable valves are provided for the water supply and overflow; and as will more fully appear from the following description.

The invention consists in the several novel features hereinafter set forth and more particularly defined by claims at the conclusion hereof.

In the drawings: Fig. 1 is a vertical section of an urn embodying the invention. Fig. 2 is a horizontal section taken on line 2—2 of Fig. 1. Fig. 3 is a vertical section on line 3—3 of Fig. 1. Fig. 4 is a side elevation of the lower portion of the urn. Fig. 5 is a detail of the connections for exhausting steam from the water chamber. Fig. 6 is a detail of the safety valve in said exhaust steam connection. Fig. 7 is a perspective of the handle for operating the water supply and overflow valves.

The invention is exemplified in an urn comprising a cylindrical body 8 provided with a bottom 9 in which is formed a chamber 10 for the water to be percolated through the coffee. The body 8 is suitably supported by legs 11. An inner cylindrical wall 12 is joined to the body 8 by an annular horizontal wall 13 and forms an air chamber 14. A jar or receptacle 15 is adapted to contain the liquid coffee. This jar is removably held in chamber 14, being provided with a ledge 16 which is adapted to rest on wall 13 and is provided with an upwardly extending wall 17 which extends over the rim of the body 8. A percolator is removably supported above the coffee jar and comprises an imperforate cylindrical side wall 18 and a foraminous bottom 19. The top of the percolator is open and its lower end rests on the ledge 16 of the jar 15. The latter is provided with a vertically extending portion 20 to confine the percolator laterally over the jar. A sheet 21 of filter medium, such as suitable paper, is placed on the bottom of the percolator. A foraminous disk 23, fixed to a ring 24, is removably held over the filter sheet and in spaced relation therefrom to prevent the water from becoming sprayed through the sheet. Ring 24 and disk 23 are removable from the percolator to permit replacement of the sheet and the percolator to be cleaned. Handles 25 are fixed to ring 24, extend upwardly to a point adjacent the upper rim of percolator 18 and are provided with hooks 26 whereby the ring may be readily lifted from the percolator.

A removable cover 27 rests on the rim of body 8 and extends over the percolator and top of jar 15. This cover is provided with a handle 28 for convenience in removal and replacement thereof and its lower rim rests on the rim of jar 15.

A water supply pipe 30 is connected to a plug valve 31 and a pipe 32 delivers water from valve 31 into the water chamber 10. The urn is designed to deliver a predetermined volume of water from chamber 10 into the percolator and to measure the water, and overflow pipe 33 has its open upper end located at the proper point for this purpose. This overflow pipe extends downwardly through the bottom 9 and is connected to a plug valve 34. The stems 35 of valves 31 and 34 are separate from one another and co-axial. A handle 36 is provided with a groove 37 which is adapted to fit around the stems of both of the valves 31 and 34 so that they will be conjointly operated to simultaneously open and close the water-supply and overflow. Handle 36 is provided with screw-threaded openings 38 for the screws to firmly secure the handle to both of these valve stems. In urns, it has heretofore been the practice to have a common rotatable plug for the overflow and water supply valve to insure an overflow outlet at all times while water is being delivered to the urn. In practice, it has been found that one of these valves will become leaky while the other will not and accurate workmanship is required in making the valves to fit their respective seats when they are on a common stem. By providing separate valves with a conjointly operating handle as aforesaid, these difficulties are overcome. Upon removal of the handle from the stems, the plug or body of either valve may be removed to be refitted while the other remains in place.

A pair of pipe sections 40 are secured by a suitable coupling 41 to the bottom of the coffee jar 15 to conduct the coffee to a pair of faucets 42. Each of said faucets has a nipple 43 which is threaded to one of the pipes 40. A sight glass 44 is connected to said faucet, as well understood in the art, to indicate the level of the coffee in the jar. In practice, it is desirable to extend the air chamber 14 around pipes 40, to prevent the coffee in the pipe from being cooled as when cold water is introduced into the water-chamber 10, the air-chamber serving as insulating means around the jar 15 and pipes 40. In practice, it occasionally becomes necessary to clean out pipes 40 or mend their connections. To make it possible to remove the pipes 40 with the coffee-jar, the space 14 is extended downwardly to form a depressed portion 14$^a$, the top of which is open to the chamber 14 and channels 14$^b$ and 14$^c$, which communicate with space 14$^a$ extend outwardly around pipes 40 to form air spaces around the outer ends of said pipes. When the faucets 42 are uncoupled from pipes 40 and the jar is uncoupled at 41, the jar can be lifted out of chamber 14 and these pipes can be readily removed. This feature makes it possible to obtain ready access to pipes 40 and to remove the jar without disturbing any of the connections between pipe 40 and the jar.

A drain 45 connects with the lower portion of the wall around the space 14$^a$ to discharge condensation from the air-chamber 14. A drain-cock 45$^a$ is connected to the bottom 9. A water faucet 45$^b$ is also connected to the water chamber 10, so that hot water may be drawn therefrom at will. Any suitable heater, such as a coil of steam pipe in the lower portion of chamber 10 or a gas burner under bottom 9, as well understood in the art, may be used to bring the temperature of the water in chamber 10 to the boiling point or desired temperature.

A pipe 46, having its lower end open and disposed adjacent the bottom 9 of chamber 10, extends upwardly to a valve 47. The water for making coffee rises through said pipe and an elbow-pipe 48, which is swiveled on the upper end of pipe 46. A stop-pin 49 on pipe 48 limits its rotation, so that when it is swung in one direction, a rosette sprayer 50, secured to the inner end of said pipe, will be centrally positioned over the percolator. Sprayer 50 comprises a hollow body 51 and a convex cover 52 screw-threaded to the body and provided with perforations 53 therein which are arranged to divide the water into a spray which will be divided to reach substantially the entire area of the percolator. Pipe 48 is held by gravity on the upper end of pipe 46, so that it can be easily removed when desired, as well as swung laterally so the sprayer will be outside of the body 8.

A pressure-relief pipe 56 is connected to body 8 above the water line and an automatic safety valve 57 is vertically slidable in a casing 58 connected to the upper end of pipe 56. A pipe 59 extends downwardly from casing 58 and is open at its lower end so that when the pressure in the chamber 10 becomes excessive, it will lift valve 57 and escape through pipe 59. A spring seated valve 60 is provided in valve 57 to prevent the formation of vacuum pressure in chamber 10. A valve 61 is included in a by-pass 62 between pipes 56 and 59, so that the chamber 10 may be left open to atmosphere to prevent the accumulation of pressure and incrustation therein, said valve being left open except while coffee is being made. This provides a construction in which the chamber 10 may be kept open to atmosphere to relieve the walls of the urn of pressure and the strains incident thereto, except while water in chamber 10 is being heated and being siphoned into the percolator.

The invention exemplifies an improved coffee urn in which the coffee jar, with its pipe leads for the faucets, may be easily removed for repair; in which separate conjointly operable valves are used for the water supply and overflow and which makes it possible to individually repair either valve without disturbing the other; and in which provision is made for spreading the spray of water over the entire percolator.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a coffee-urn, the combination of a receptacle having a water-chamber therein, a coffee-jar in the receptacle, a percolator comprising a siphon connection from the water-chamber to the percolator, a discharge pipe connected to the lower end of the jar, a faucet to which the outer end of said pipe is connected, and an inner wall for the water-chamber spaced and separated from said pipes to permit the removal of the jar with the pipe thereon from the top of the receptacle.

2. In a coffee-urn, the combination of a receptacle having a water-chamber therein, a coffee-jar in the receptacle, a percolator comprising a siphon connection from the water-chamber to the percolator, a plurality of discharge pipes connected to the lower end of the jar, faucets to which the outer ends of said pipes are connected, and an inner wall for the water-chamber spaced and separate from said discharge pipes to permit the removal of the jar conjointly with said pipes.

Signed at Chicago, Illinois, this 9 day of July, 1923.

WILLIAM H. PETERSEN.